US009001475B2

(12) United States Patent
Lee et al.

(10) Patent No.: US 9,001,475 B2
(45) Date of Patent: Apr. 7, 2015

(54) THERMAL SHUTDOWN UNIT, SWITCH CONTROLLER INCLUDING THE SAME, AND CONTROL METHOD OF THERMAL SHUTDOWN PROTECTION OPERATION

(75) Inventors: Min-Woo Lee, Bucheon (KR); Kyung-Oun Jang, Bucheon (KR); Dae-Woong Cho, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 815 days.

(21) Appl. No.: 13/184,187

(22) Filed: Jul. 15, 2011

(65) Prior Publication Data

US 2012/0033465 A1 Feb. 9, 2012

(30) Foreign Application Priority Data

Aug. 5, 2010 (KR) .................. 10-2010-0075542

(51) Int. Cl.
*H02H 7/125* (2006.01)
*H02M 3/335* (2006.01)
*H02M 1/36* (2007.01)
*H02M 1/32* (2007.01)

(52) U.S. Cl.
CPC ............ *H02M 3/33507* (2013.01); *H02M 1/36* (2013.01); *H02M 2001/327* (2013.01)

(58) Field of Classification Search
CPC ..... H02M 1/32; H02M 1/36; H02M 3/33507; H02M 2001/327; H02H 7/1213; H03K 17/0822
USPC ......................................................... 361/18
See application file for complete search history.

(56) References Cited

U.S. PATENT DOCUMENTS

| 5,008,736 | A | 4/1991 | Davies et al. |
| 5,291,387 | A * | 3/1994 | Ohshima .................... 363/56.11 |
| 6,128,172 | A | 10/2000 | Feldtkeller |
| 6,541,999 | B2 * | 4/2003 | Gergintschw et al. .......... 326/32 |
| 6,667,868 | B2 | 12/2003 | Portaluri et al. |
| 6,717,530 | B1 | 4/2004 | Schmidt et al. |
| 7,301,746 | B2 | 11/2007 | Devarajan et al. |
| 2002/0113617 | A1 | 8/2002 | Gergintschw et al. |

FOREIGN PATENT DOCUMENTS

| CN | 101521369 A | 9/2009 |
| CN | 201499093 U | 6/2010 |

OTHER PUBLICATIONS

FSL136MR Green Mode Fairchild Power Switch (FPS), Feb. 2010, pp. 1-13, Rev. 1.0.6 datasheet, 2009 Fairchild Semiconductor Corporation.
SanKen STR-W6251D, 30 W-Universal Input/45 W-230 Vac Input PWM Switching Regulators, pp. 1-15, Sanken datasheet SSE23661, 2006-2007 Allegro MicroSystems, Inc.
ST VIPER17, Off-line high voltage converters, Feb. 2008, pp. 1-31, STMicroelectronics.
CoolSET—F3R, ICE3BR4765J, Jun. 10, 2008, pp. 1-31, Version 2.2 datasheet, InfineonTechnologies AG.

* cited by examiner

*Primary Examiner* — Thienvu Tran
*Assistant Examiner* — Kevin J Comber
(74) *Attorney, Agent, or Firm* — Okamoto & Benedicto LLP (57) ABSTRACT

The present invention relates to a thermal shutdown unit, a switch controller including the same, and a method controlling a thermal shutdown protection operation. The present invention determines the operation state of an SMPS to vary a reference temperature for controlling a thermal shutdown protection operation according to an operation state of the SMPS.

27 Claims, 6 Drawing Sheets

THERMAL SHUTDOWN UNIT, SWITCH CONTROLLER INCLUDING THE SAME, AND CONTROL METHOD OF THERMAL SHUTDOWN PROTECTION OPERATION

CROSS-REFERENCE TO RELATED APPLICATION

This application claims priority to and the benefit of Korean Patent Application No. 10-2010-0075542 filed in the Korean Intellectual Property Office on Aug. 5, 2010, the entire contents of which are incorporated herein by reference.

BACKGROUND OF THE INVENTION (a) Field of the Invention

The present invention relates to a thermal shutdown unit, a switch controller including the same, and a method controlling a thermal shutdown protection operation. Particularly, the present invention relates to a thermal shutdown unit, a switch controller including the same, and a method controlling a thermal shutdown protection operation to prevent damage due to a heat generated in a switch controller and a power switch applied to a switch mode power supply device.

(b) Description of the Related Art

A switch mode power supply device (hereafter, SMPS) rectifies an input AC voltage into an input DC voltage (referred to as a dc-link voltage), and converts the input DC voltage into a DC output voltage of another level. In this case, the output DC voltage is higher or lower than the input DC voltage. The SMPS is generally used for electronic devices such as a battery charger of a mobile phone and an adaptor of a laptop computer.

In general, the SMPS controls a switching operation of the power switch of the primary side according to the magnitude of the current supplied to the load to control the current amount flowing in the power switch of the primary side. The SMPS feeds back the output voltage to the capacitor of the primary side, and controls the duty of the power switch of the primary side through the feedback voltage charged to the capacitor of the primary side to constantly maintain the output voltage.

In detail, the SMPS decreases the feedback voltage charged to the capacitor when the current amount is decreased such that the output voltage is increased, and decreases the feedback voltage charged to the capacitor when the current amount is increased such that the output voltage is decreased.

When the load connected to the SMPS is an overload, the heat generated in the SMPS is increased, and if the SMPS is continuously operated in a high temperature environment, an operation error or damage due to the heat generated in the SMPS is generated in the controller controlling the operation of the SMPS. To prevent this, a thermal shutdown (TSD) block having a TSD function to shut down the operation of the SMPS according to the heat generated in the SMPS is applied to the controller.

In detail, to sense the heat generated in the controller, a power switch including a thermal sensing circuit may be mounted, however this power switch increases the production cost of the SMPS.

The above information disclosed in this Background section is only for enhancement of understanding of the background of the invention and therefore it may contain information that does not form the prior art that is already known in this country to a person of ordinary skill in the art.

SUMMARY OF THE INVENTION

A technical object of the present invention provides a thermal shutdown unit, a switch controller including the same, and a thermal shutdown protection operation controlling method improving the function of the TSD according to the load without an additional sensing circuit while using the general power switch.

A method of controlling a thermal shutdown protection operation of a controller controlling an operation of an SMPS according to the present invention includes: determining whether the SMPS is in an overload state; determining whether the SMPS is in a start-up state in which the SMPS starts to be operated; and varying a reference temperature to control the thermal shutdown protection operation of the controller according to the result of the determination of the overload state and the determination of the start-up state.

The method may further includes determining whether the SMPS is in a protection state in which a power source voltage for the operation of the controller is decreased such that the switching operation of the power switch controlling the operation of the SMPS is not generated. The variation of the reference temperature may vary the reference temperature according to the result of the determination of the overload state, the determination of the start-up state, and the determination of the protection state. In the variation of the reference temperature, the reference temperature corresponding to the overload state may be set up as a temperature that is lower than the reference temperature corresponding to the start-up state and the protection state.

The variation of the reference temperature may include: setting up the reference temperature as a first reference temperature when the operation state of the SMPS is not the overload state, the start-up state, and the protection state, but is a normal state; setting up the reference temperature as a second reference temperature when the operation state of the SMPS is the start-up state as the determination result of the start-up state; setting up the reference temperature as a third temperature when the operation state of the SMPS is the overload state as the determination result of the overload state; and setting up the reference temperature as a fourth temperature when the operation state of the SMPS is the protection state as the determination result of the protection state, wherein the first reference temperature is lower than the second and fourth reference temperatures and higher than the third reference temperature. The determination of the overload state may include determining the overload by using a feedback voltage corresponding to the output voltage of the SMPS.

The determination of the start-up state may include sensing the power source voltage for the operation of the controller to determine the start-up state. The variation of the reference temperature may include setting up the reference temperature corresponding to the overload state as the temperature that is lower than the reference temperature corresponding to the start-up state.

The variation of the reference temperature may include: setting up the reference temperature as the first reference temperature when the operation state of the SMPS is not the overload state and the start-up state, but is a normal state; setting up the reference temperature as the second reference temperature when the operation state of the SMPS is the start-up state as the determination result of the start-up state; and setting up the reference temperature as the third temperature when the operation state of the SMPS is the overload state as the determination result of the overload state, wherein the first reference temperature may be lower than the second reference temperature and higher than the third reference temperature.

A thermal shutdown unit controlling a thermal shutdown protection operation of a controller controlling an operation of an SMPS according to the present invention includes: at least one diode; a shutdown comparator comparing a temperature sensing voltage generated in the at least one diode with a thermal shutdown reference voltage to control the thermal shutdown protection operation; and a thermal shutdown reference voltage selection unit varying the thermal shutdown reference voltage according to the operation state of the SMPS, wherein the temperature sensing voltage is varied according to the heat generated in the controller, and the operation state of the SMPS includes an overload state and a start-up state.

The operation state of the SMPS may further include a protection state in which the power source voltage for the operation of the controller is decreased such that the switching operation of the power switch controlling the operation of the SMPS is not generated.

The thermal shutdown reference voltage corresponding to a normal state that is not the overload state, the start-up state, and the protection state among the operation states of the SMPS may be different from the thermal shutdown reference voltage corresponding to the start-up state, the protection state, or the overload state.

The thermal shutdown reference voltage corresponding to the normal state that is not the overload state and the start-up state among the operation states of the SMPS may be different from the second thermal shutdown reference voltage corresponding to the start-up state and the third thermal shutdown reference voltage corresponding to the overload state. The thermal shutdown reference voltage corresponding to the overload state may be different from the thermal shutdown reference voltage corresponding to the start-up state. The temperature sensing voltage may be decreased as the temperature of the controller is increased.

The thermal shutdown reference voltage selection unit may include: an overload sensing unit sensing the overload state by using the feedback voltage corresponding to the output voltage of the SMPS; a start-up sensing unit sensing the start-up state by using the power source voltage for the operation of the controller; and a reference voltage selector selecting one of first to third thermal shutdown reference voltages corresponding to the overload state, the start-up state, and a normal state that is not the start-up state and the overload state according to the operation state of the SMPS.

The overload sensing unit may include: a first comparator generating an output signal according to a result of comparing the feedback voltage with a predetermined overload reference voltage to determines the overload state; a first counter generating a first controlling signal if a predetermined first delay period is counted from a time that the overload state is generated; and an overload latch operating the counter in synchronization with the output signal of the first comparator, wherein the feedback voltage is higher than the overload reference voltage if the overload state is generated.

The start-up sensing unit may include a second counter generating a second controlling signal if the predetermined second delay period is counted from a time that the power source voltage is increased to the voltage level for the operation of the controller. The reference voltage selector may select the third thermal shutdown reference voltage corresponding to the overload state according to the first controlling signal and the second thermal shutdown reference voltage corresponding to the start-up state according to the second controlling signal.

The reference voltage selector may include: a first transmission gate having an input terminal input with the first thermal shutdown reference voltage, a first control terminal input with the first controlling signal, a second control terminal input with a first inversion controlling signal of which the first controlling signal is inverted, and an output terminal; a second transmission gate having an input terminal input with the third thermal shutdown reference voltage, a first control terminal input with the first inversion controlling signal, a second control terminal input with the first controlling signal, and an output terminal; and a third transmission gate having an input terminal connected to the output terminal of the first and second transmission gates, the first control terminal input with the second inversion controlling signal of which the second controlling signal is inverted, the second control terminal input with the second controlling signal, and an output terminal connected to the input terminal of the shutdown comparator.

The reference voltage selector may further include a fourth transmission gate having an input terminal input with the second thermal shutdown reference voltage, the first control terminal input with the second controlling signal, a second control terminal input with the second inversion controlling signal, and an output terminal connected to one input terminal of the shutdown comparator.

The shutdown comparator may include one input terminal connected to the output terminal of the third and fourth transmission gates, and the other input terminal input with the temperature sensing voltage.

A switch controller controlling a switching operation of a power switch controlling an operation of an SMPS according to the present invention includes: a PWM controller SMPS controlling turn-off of a power switch according to a feedback voltage corresponding to an output voltage and a sensing voltage corresponding to a current flowing through the power switch, and turning on the power switch according to the clock signal determining a switching frequency of the power switch; and a thermal shutdown unit varying the thermal shutdown reference voltage controlling the thermal shutdown protection operation of the switch controller according to the operation state of the SMPS, and generating a thermal shutdown signal and transmitting it to the PWM controller if the temperature sensing voltage corresponding to the temperature of the switch controller reaches the thermal shutdown reference voltage, wherein the PWM controller turns off the power switch according to the thermal shutdown signal.

The thermal shutdown unit may include: at least one diode of which the temperature sensing voltage is generated; a shutdown comparator comparing the temperature sensing voltage with a thermal shutdown reference voltage to control the thermal shutdown protection operation; and a thermal shutdown reference voltage selection unit changing the thermal shutdown reference voltage according to the operation state of the SMPS, wherein the temperature sensing voltage is varied according to the heat generated in the controller, and the operation state of the SMPS includes an overload state and a start-up state.

The operation state of the SMPS may further include a protection state in which the power source voltage for the operation of the controller is decreased such that the switching operation of the power switch controlling the operation of the SMPS is not generated.

The thermal shutdown reference voltage corresponding to a normal state that is not the overload state, the start-up state, and the protection state among the operation states of the SMPS may be different from the thermal shutdown reference voltage corresponding to the start-up state, the protection state, or the overload state.

The temperature sensing voltage may be decreased as the temperature of the switch controller is increased. The thermal shutdown reference voltage corresponding to the normal state may be higher than the thermal shutdown reference voltage corresponding to the start-up state and lower than the thermal shutdown reference voltage corresponding to the overload state. The thermal shutdown reference voltage corresponding to the protection state may be lower than the thermal shutdown reference voltage corresponding to the normal state and the thermal shutdown reference voltage corresponding to the overload state.

The present invention provides the thermal shutdown unit, the switch controller including the same, and the thermal shutdown protection operation controlling method improving the function of the TSD according to the load without the separate sensing circuit while using the general power switch.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in several exemplary embodiments, constituent elements having the same configuration are representatively described in a first exemplary embodiment by using the same reference numerals, and only constituent elements other than the constituent elements described in the first exemplary embodiment will be described in other embodiments.

In order to clarify the present invention, elements extrinsic to the description are omitted, and like reference numerals refer to like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
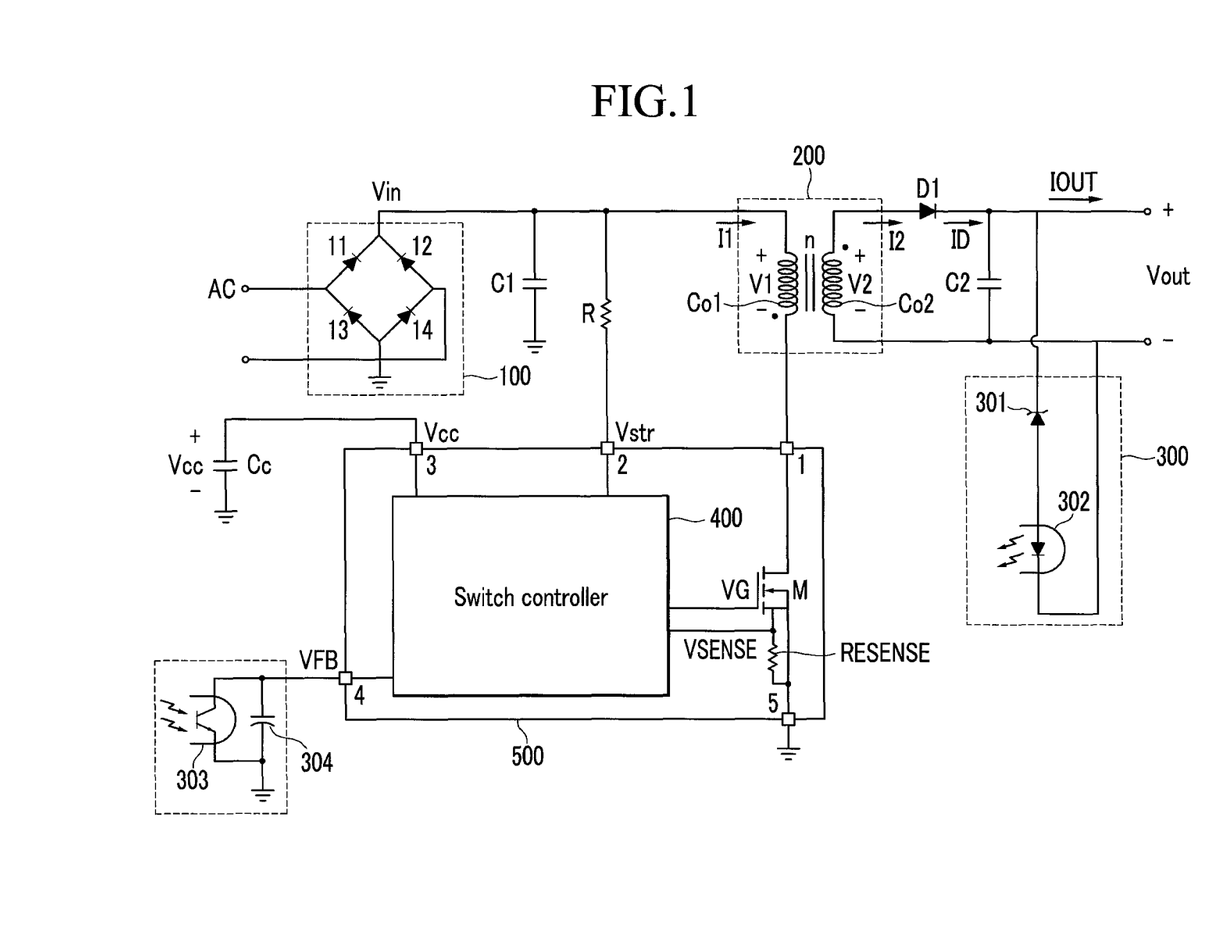
FIG. 1 is a view showing an SMPS including a controller applied with a thermal shutdown protection operation controlling method according to an exemplary embodiment of the present invention.

FIG. 1 is a view showing an SMPS including a controller applied with a thermal shutdown protection operation controlling method according to an exemplary embodiment of the present invention. An SMPS according to an exemplary embodiment of the present invention is realized as a fly-back converter type. However, the present invention is not limited thereto, and a converter of another type may be applied.

The thermal shutdown protection operation is a protection operation to prevent damage to the controller due to the heat generated in the controller. In detail, the thermal shutdown protection operation is a protection operation to prevent damage to the switch controller controlling the switch operation of the power switch and the power switch forming the controller due to heat.

As shown in FIG. 1, an SMPS according to an exemplary embodiment of the present invention includes a bridge diode 100, a transformer 200, a feedback circuit unit 300, and a controller 500. The controller 500 includes a power switch M and a switch controller 400 controlling the switching operation of the power switch M. The controller 500 has a configuration for controlling the operation of the SMPS, and the output power of the SMPS is controlled according to the switching operation of the power switch M. The switch controller 400 and the switch M are formed with a separated chip, and two chips are combined into one package and configure the controller 500.

The power switch M is a metal-oxide semiconductor field-effect transistor (hereafter referred to as "MOSFET") of an n-channel type. The power switch M has a gate electrode as a controlling electrode, and a drain electrode and a source electrode as two electrodes. The drain electrode is connected to one terminal of the primary side coil Co1 of the transformer 200, and the source electrode is grounded. The gate electrode of the power switch M is input with a gate signal VG from the gate driver 460, and the power switch M is turned on/off according to the gate signal VG. If the gate signal VG is the high level, the power switch M is turned on, and if the gate signal VG is the low level, the power switch M is turned off.

The bridge diode 100 includes four diodes 11-14, and wave rectifies the input AC power source AC to generate the input voltage Vin. The input voltage Vin is smoothed through a smoothing capacitor C1 and is supplied to the transformer 200.

The transformer 200 includes a primary side coil Co1 transmitted with the input voltage Vin and a secondary side coil Co2 connected to a load. The ratio of the turn number of the primary side coil Co1 and the turn number of the secondary side coil Co2 is referred to as a turn ratio n. The turn ratio n is a value of which the turn number of the secondary side coil Co2 is divided by the turn number of the primary side coil Co1. A voltage of which the turn ratio is multiplied by the primary side coil voltage V1 is the secondary side coil voltage V2.

One terminal of the primary side coil Co1 is supplied with the input voltage Vin and the other terminal of the primary side coil Co1 is connected to the drain electrode of the power switch M. One terminal of the secondary side coil Co2 is connected to the anode of the diode D1, and the other terminal is connected to one terminal of the output capacitor C2. The other terminal of the output capacitor C2 is connected to the cathode of the diode D1. The voltage of both terminals of the output capacitor C2 becomes the output voltage Vout.

If the power switch M is turned on, the voltage of both terminals V1 of the primary side coil Co1 is the input voltage Vin, and the primary side current I1 flowing in the primary side coil Co1 is increased. The primary side current I1 is increased with a slope that is proportional to the input voltage Vin. The switch current Is is the same as the primary side current I1 during the period in which power switch M is turned on.

If the power switch M is turned off, the primary side coil voltage V1 as the negative voltage is the voltage of which the output voltage Vout is divided by the turn ratio n. The primary side current I1 is decreased with a slope that is proportional to the output voltage Vout. The power switch M is in the off state such that the switch current Is is 0. After the turn-off of the power switch M, the secondary side coil voltage V2 becomes the positive voltage such that the diode D1 is turned on, and the current I2 flowing in the secondary side coil Co2 is rectified through the diode D1 to generate the rectify current ID. The rectified current ID charges the output capacitor C2, or flows to the load connected to the SMPS. The output capacitor C2 is charged by the rectified current ID and supplies the current required for the load. Accordingly, the output current Iout supplied to the load is determined according to the load, and is the rectified current ID or the current supplied from the rectified current ID and the capacitor C2.

The feedback circuit unit 300 includes a shunt regulator 301, an opto diode 302, an opto transistor 303, and a feedback capacitor 304. The feedback circuit unit 300 generates feedback information corresponding to the output voltage Vout and transmits it to the switch controller 400. In detail, the feedback circuit unit 300 generates the feedback voltage VFB that is changed according to the output voltage Vout and transmits it to the switch controller 400. The switch controller 400 controls the switching operation of the power switch M according to the feedback voltage VFB to regulate the output voltage Vout.

The reference pin of the shunt regulator 301 is applied with the output voltage Vout, and the output pin is connected to one terminal of the opto diode 303. If the reference pin voltage is higher than the predetermined reference voltage of the shunt regulator 301, the current flowing in the opto diode 302 is increased. As the output voltage Vout becomes a larger voltage, the current flowing in the opto diode 302 is increased. Positive photons corresponding to the current flowing in the opto diode 302 are emitted. Thus, the current generated according to the photon amount flows in the opto transistor 303 forming the opto diode 302 and the opto coupler. As the current flowing in the opto transistor 303 is increased, the feedback capacitor 304 is discharged such that the feedback voltage VFB is decreased. In contrast, as the current flowing in the opto transistor 303 is decreased, it is charged by the feedback current IFB (referring to FIG. 2) supplied from the switch controller 400 such that the feedback voltage VFB is increased.

Figure 2:
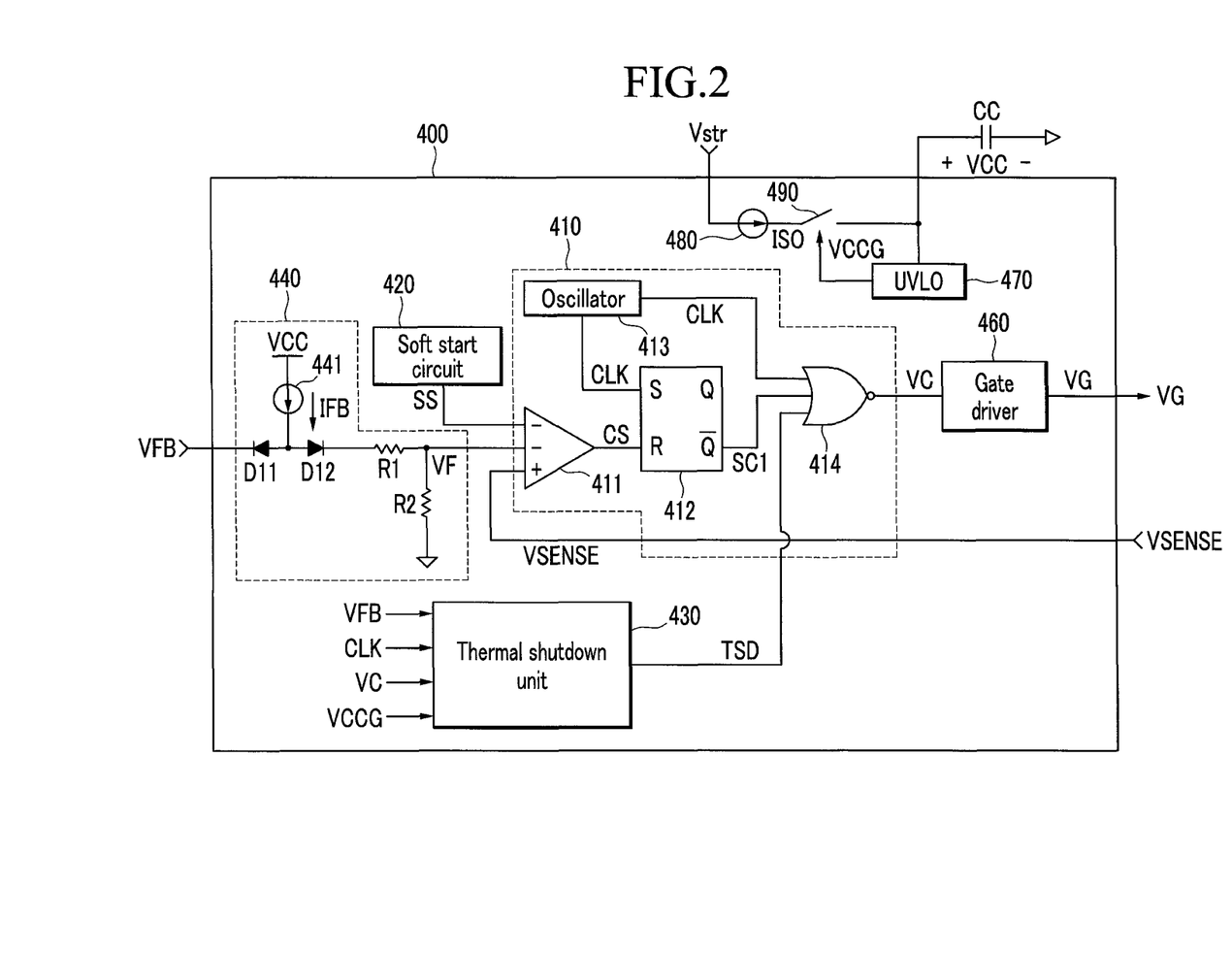
FIG. 2 is a view showing a configuration of a switch controller 400 according to an exemplary embodiment of the present invention.

FIG. 2 is a view showing a configuration of a switch controller 400 according to an exemplary embodiment of the present invention. The controller 500 will be described with reference to FIGS. 1 and 2.

The controller 500 includes a plurality of connection terminals 1-5. The input terminal of the power switch M is connected to the primary side coil Co1 through the connection terminal 1, and the power switch M according to an exemplary embodiment of the present invention is an N channel transistor such that the input terminal of the power switch M is the drain electrode. The start voltage Vstr of which the input voltage Vin is changed through the resistor R is transmitted to the controller 500 through the connection terminal 2. The start voltage Vstr is used to generate the power source voltage VCC required to operate the switch controller 400.

The connection terminal 3 is connected to the power source capacitor CC, the connection terminal 4 is connected to the feedback circuit unit 300, and the connection terminal 5 is grounded.

The switch controller 400 includes a PWM controller 410, a soft start circuit 420, a thermal shutdown unit 430, a feedback unit 440, a gate driver 460, a low voltage shutdown unit (hereafter, an undervoltage lockout, referred to as "UVLO") 470, a power source current source 480, and a power source controlling switch 490.

The switch controller 400 senses the load according to the feedback voltage VFB, and controls a reference voltage (hereinafter, a thermal shutdown reference voltage) to control the thermal shutdown protection operation. Also, the switch controller 400 controls the thermal shutdown reference voltage during the start-up period of the SMPS such that the SMPS is not stopped by the thermal shutdown protection operation before the power source voltage VCC reaches the normal state. The switch controller 400 controls the switching operation of the power switch M according to the clock signal CLK, the feedback voltage VFB, and the sensing voltage VSENSE determining the switching frequency of the power switch M.

The source electrode of the power switch M according to an exemplary embodiment of the present invention is connected to the sensing resistor RSENSE such that a predetermined ratio of the switch current Is flowing in the power switch M flows in the sensing resistor RSENSE. The sensing voltage VSENSE generated to the sensing resistor RSENSE has the same phase and frequency as the voltage determined according to the switch current Is. The predetermined ratio is set up as a very small value such that the sensing resistor RSENSE is set up as a sufficient value for the sensing voltage VSENSE to be capable of an appropriate level.

The power source current source 480 receives the start voltage Vstr to generate a power source current ISO by using the start voltage Vstr, and supplies the power source current ISO to the power source capacitor CC. The voltage charged to the power source capacitor CC is the power source voltage VCC, and is supplied as a voltage required for the operation of the switch controller 400.

The power source controlling switch 490 is connected between the power source current source 480 and the power source capacitor CC, and if the power source controlling switch 490 is turned on such that the power source current source 480 and the power source capacitor CC are connected to each other, a power source capacitor CC is charged by the power source current ISO such that the power source voltage VCC is increased. If the power source controlling switch 490 is turned off, the power source capacitor CC is discharged by the operation of the switch controller 400 such that the power source voltage VCC is decreased.

Figure 4:
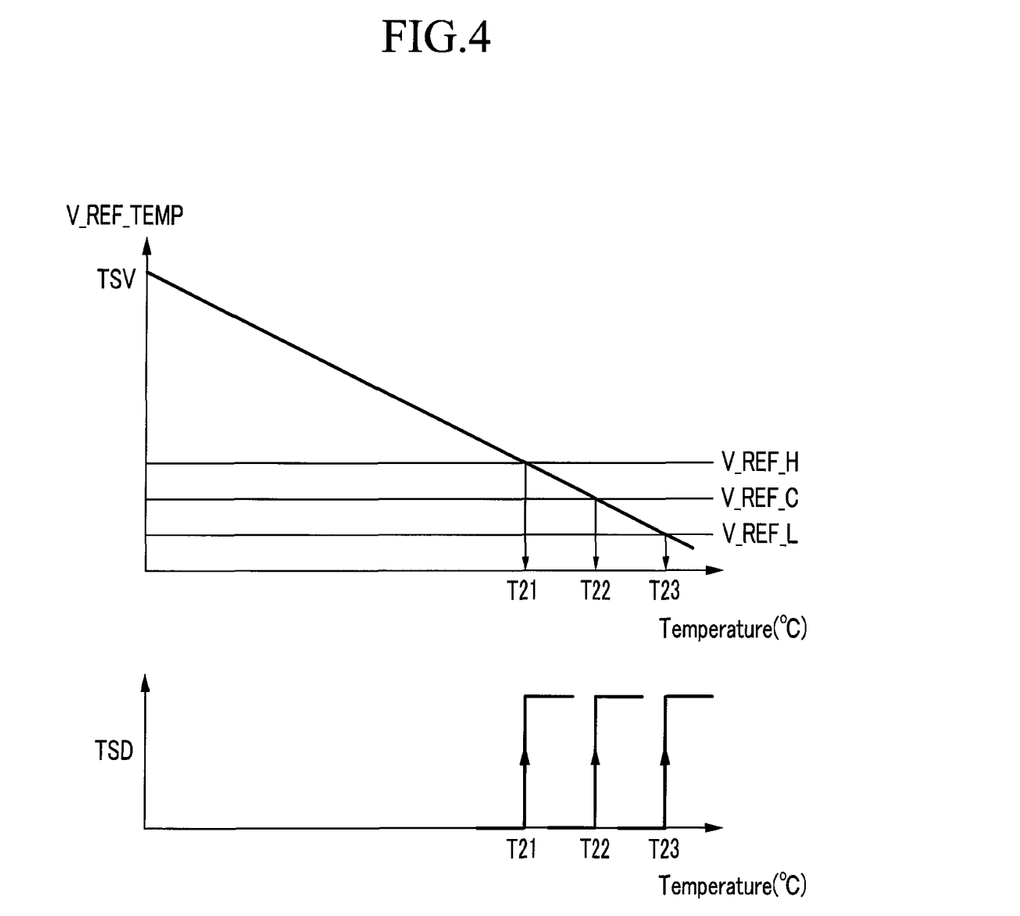
FIG. 4 is a view showing a time that a thermal shutdown protection operation is generated according to the operation state of the SMPS when a temperature sensing voltage TSV is decreased according to a temperature increase of a switch controller 400 according to an exemplary embodiment of the present invention.

If the UVLO 470 senses the power source voltage VCC such that the power source voltage VCC is decreased to the first low voltage reference voltage VL of FIG. 4, the power source controlling switch 490 is turned on. If the power source voltage VCC reaches the second low voltage reference voltage VH of FIG. 4, the UVLO 470 turns off the power source controlling switch 490. As described above, the UVLO 470 maintains the power source voltage VCC as the voltage of the appropriate range for the operation of the switch controller 400. In detail, if the power source voltage VCC is decreased to the first low voltage reference voltage VL, the UVLO 470 generates the power source detection signal VCCG of the low level to turn on the power source controlling switch 490, and if the power source voltage VCC reaches the second low voltage reference voltage VH, it generates a power source detection signal VCCG of a high level to turn off the power source controlling switch 490. The power source detection signal VCCG is maintained as the low level during the time that the power source voltage VCC is increased from the first low voltage reference voltage VL to the second low voltage reference voltage VH, and the power source detection signal VCCG is maintained as the high level during the time that it is decreased from the second low voltage reference voltage VH to the first low voltage reference voltage VL.

The period from the time that the SMPS starts to be operated before the time that the switch controller 400 is normally operated is referred to as a start-up period. The UVLO 470 generates the power source detection signal VCCG of the low level during the start-up period to maintain the power source controlling switch 490 in the turn-on state. In detail, the power source detection signal VCCG is the high level and the power source controlling switch 490 is in the state during the period from the time that SMPS starts to be operated to the time that the power source voltage VCC reaches the second low voltage reference voltage VH.

The feedback unit 440 generates a feedback signal VF corresponding to the feedback voltage VFB to transmit it to the PWM controller 410. The feedback unit 440 includes a feedback current source 441, diodes D11 and D12, and resistors R1 and R2.

The feedback current source 441 generates the feedback current IFB by using the power source voltage VCC. The anode of the diode D11 is connected to the anode of the diode D12. The cathode of the diode D11 is connected to the feedback capacitor 304 of the feedback circuit unit 300 and the opto transistor 303. The cathode of the diode D12 is connected to one terminal of the resistor R1, and the other terminal of the resistor R1 and one terminal of the resistor R2 are connected to the first inversion terminal (−) of a PWM comparator 411. The other terminal of the resistor R2 is grounded.

The feedback current IFB flows to the feedback circuit unit 300 through the diode D11, and flows to the resistor R1 and the resistor R2 through the diode D12. The current amount flowing through the diode D11 and current amount flowing through the diode D12 among the feedback current IFB are determined according to the feedback voltage VFB.

In detail, if the load is increased, the output voltage Vout is decreased, and the current supplied to the feedback capacitor 305 among the feedback current IFB is decreased. Accordingly, the current flowing in the resistor R1 and the resistor R2 is increased such that the feedback signal VF is increased. Here, the current flowing in the opto transistor 303 is small such that the feedback voltage VFB is charged by a portion of the feedback current IFB thereby being the high voltage, and is maintained as the voltage when the diode D11 is turned off.

In contrast, if the load is decreased, the output voltage Vout is increased and the current supplied to the feedback capacitor 305 among the feedback current IFB is increased. Accordingly, the current flowing in the resistor R1 and the resistor R2 is decreased such that the feedback signal VF is decreased. Here, the current flowing in the opto transistor 303 is large such that the feedback voltage VFB is discharged, and then becomes the low voltage.

As described above, the feedback unit 440 generates the feedback signal VF that is changed according to the feedback voltage VFB, and the feedback signal VF is increased/decreased according to the increasing/decreasing of the feedback voltage VFB.

The soft start circuit 420 generates the soft start voltage SS that is increased during the soft start period from the time that the SMPS starts to be operated to the time that the output voltage Vout is stabilized and transmits it to the PWM controller 410. The output voltage Vout is controlled to be slowly increased from the time that the SMPS starts to be operated and to be increased to the predetermined regulation voltage level. Here, to slowly increase the output voltage Vout, the switch controller 400 controls the switching operation of the power switch M according to the soft start voltage SS. The output voltage Vout is a voltage that is lower than the regulation voltage level during the soft start period such that the feedback signal VF is the voltage that is higher than the soft start voltage SS. However, if the soft start period is finished, the feedback signal VF becomes the voltage that is lower than the soft start voltage SS.

The PWM controller 410 turns off the power switch M and turns on the power switch M according to a predetermined switching frequency, to control the current flowing to the power switch M according to the load. The PWM controller 440 controls the switching operation of the power switch M by using the thermal shutdown signal TSD, the sensing voltage VSENSE, the soft start voltage SS, and the feedback signal VFB. The switching frequency of the power switch M is determined according to the clock signal CLK. The duty of the power switch M is determined according to the load. If the thermal shutdown signal TSD is generated, the PWM controller 410 turns off the power switch M.

In detail, the duty of the power switch M is determined according to the soft start voltage SS in the soft start period. After the output voltage Vout is increased to the regulation voltage level, the duty of the power switch M is determined according to the load. As the load is increased, the feedback voltage VFB is increased such that the duty is increased, and as the load is decreased, the feedback voltage VFB is decreased such that the duty is decreased.

The PWM controller 410 includes the PWM comparator 411, an SR latch 412, an oscillator 413, and a logic operator 414. The logic operator 414 as a configuration for generating the gate controlling signal VC uses a NOR gate in the exemplary embodiment of the present invention. However, the present invention is not limited thereto. That is, the logic operator 414 may be appropriately realized according to the edge of the clock signal CLK determining the time for turning on the power switch M, the edge of the output signal SC1 of the SR latch 412 for turning off the power switch M, and the level of the thermal shutdown signal TSD.

The PWM comparator 411 includes two inversion terminals (−) respectively input with the feedback signal VF and the soft start voltage SS, and a non-inversion terminal (+) input with the sensing voltage VSENSE. If the to PWM comparator 411 compares a further lower signal among the signals input to two inversion terminals (−), and the signal input to the non-inversion terminal (+) and the signal input to the non-inversion terminal (+) input is higher than the further lower signal, it generates the comparison signal CS of the high level, and if the signal input to the non-inversion terminal (+) is lower than the further lower signal, it generates the comparison signal CS of the low level. Accordingly, if the sensing voltage VSENSE reaches the soft start voltage SS during the soft start period, the PWM comparator 411 generates the comparison signal CS of the high level, and if the sensing voltage VSENSE reaches the feedback signal VF after the soft start period is fished, the PWM comparator 411 generates the comparison signal CS of the high level.

The SR latch 412 includes a reset terminal R input with the comparison signal CS and a set terminal S input with the clock signal CLK. The SR latch 412 generates the output signal SC1 of the low level in synchronization with the increasing edge of the signal input to the set terminal S, and the output signal SC1 of the high level in synchronization with the increasing edge of the signal input to the reset terminal R. The output signal SC1 is output through the inversion output terminal /Q.

If at least one of the input clock signal CLK, the output signal SC1, and the thermal shutdown signal TSD is the high level, the logic operator 414 generates the gate controlling signal VC of the low level, and when all three signals are the low level, it generates the gate controlling signal VC of the high level. Accordingly, the logic operator 414 generates the gate controlling signal VC of the high level in synchronization with the decreasing edge of the clock signal CLK, and the gate controlling signal VC of the low level in synchronization with the increasing edge of the output signal SC1. Also, if the thermal shutdown signal TSD of the high level is generated, the logic operator 414 generates the gate controlling signal VC of the low level.

The gate driver 460 generates the gate signal VG according to the gate controlling signal VC and transmits it to the gate electrode of the power switch M. In detail, the gate driver 460 generates the gate signal VG of the high level according to the gate controlling signal VC of the high level, and generates the gate signal VG of the low level according to the gate controlling signal VC of the low level.

The thermal shutdown unit 430 changes the thermal shutdown reference voltage V_REF determining the thermal shutdown protection operation according to the operation state of SMPS such that damage to the controller 500 by the heat may be prevented, and the unnecessary thermal shutdown protection operation is prevented. In detail, the configuration that generates the most heat in the controller 500 is the power switch M. The controller 500 may be damaged by the heat generated in the power switch M. Accordingly, if the temperature of the power switch M reaches the predetermined threshold temperature, the thermal shutdown unit 430 generates the thermal shutdown signal TSD to turn off the power switch M. Here, the operation state of the SMPS is divided into the start-up period, the overload period, and the normal period.

The temperature of the power switch M is measured to recognize the thermal state of the power switch M. However, a separate configuration to measure the temperature of the power switch M generally must be formed along with the power switch M, thereby increasing the manufacturing cost. Accordingly, the present invention predicts the temperature of the power switch M by using the feedback signal VFB having the state information of the load such that the thermal shutdown protection operation is controlled.

A difference according to the operation state of the SMPS is generated between the temperature of the switch controller 400 and the temperature of the power switch M. The temperature of the switch controller 400 may be higher than the temperature of the power switch M during the period in which the SMPS is in the start-up state, and the temperature of the switch controller 400 may be lower than the temperature of the power switch M during the period in which the SMPS is in the overload state.

The switching operation of the power switch M is not generated in the start-up period, and the power source capacitor CC is charged in the switch controller 400 according to the power source current ISO. Accordingly, the temperature of the switch controller 400 is higher than the temperature of the power switch M such that the thermal shutdown protection operation may be unnecessary generated. The duty of the power switch M is increased in the overload period such that the temperature of the switch controller 400 is higher than the temperature of the power switch M. Thus, a problem that the thermal shutdown protection operation is slow is generated. The temperatures between the two configurations are similar in the normal state period.

The switch controller 400 according to an exemplary embodiment of the present invention respectively sets up different reference temperatures of the start-up period, the protection state period, and the overload period with reference to the first reference temperature at which the thermal shutdown protection operation is generated in the normal state period. The protection state means the state in which the switch controller 400 is not operated when the power source voltage VCC is decreased such that the operation of the switch controller 400 is not appropriate. When the temperature of the switch controller 400 is higher than the reference temperature, the switch controller 400 starts the thermal shutdown protection operation.

For example, the switch controller 400 raises the second reference temperature rather than the first reference temperature during the start-up period, and decreased the third reference temperature rather than the first reference temperature during the overload period.

The damage to the controller 500 by the heat generated in the power switch M is easily generated in the overload state such that the third reference temperature is most decreased to advance the thermal shutdown protection operation time. In contrast, thermal shutdown protection operation time is delayed to prevent the generation of the thermal shutdown protection operation before the power source voltage VCC is increased to the voltage for the operation of the switch controller 400 in the start-up state.

In another example, in the protection state, the power source voltage VCC is decreased such that the power source voltage VCC must be increased, and thereby the reference temperature for the thermal shutdown protection sets up the reference temperature that is higher than the normal state. The period in which the power source voltage VCC is increased to the voltage that is capable of operating the switch controller 400 may generate high heat compared to the normal state period. If the thermal shutdown protection operation reference voltage is maintained with the same voltage as the normal state in the protection state, the thermal shutdown protection operation may be generated before the power source voltage VCC is sufficiently increased.

In an exemplary embodiment of the present invention, the thermal shutdown protection operation is controlled with the same second reference temperature as in the start-up period in the protection state period generated by the decreasing of the power source voltage VCC.

Next, in the exemplary embodiment, a means for sensing the power source voltage VCC for the determination of the start-up state is used, a start-up state determiner together determines the protection state when the power source voltage VCC is decreased such that the switching operation of the power switch M is not generated, and the reference temperature for the thermal shutdown protection operation is equally set to the second reference temperature. However, the present invention is not limited thereto, and the reference temperature in the protection state in which the power source voltage VCC is decreased such that the switching operation of the power switch M is not generated is set to be higher than the first reference temperature. In detail, the thermal shutdown unit 430 generates the temperature sensing voltage TSV that is varied according to the temperature of the switch controller 400 by using at least one diode as the means to measure the temperature of the switch controller 400, and compares one of first to third thermal shutdown reference voltages V_REF_C, V_REF_L, and V_REF_H corresponding to the first to third reference temperatures with the temperature sensing voltage TSV to generate the thermal shutdown signal TSD of the high level according to the comparison result.

The temperature sensing voltage TSV is a voltage having a characteristic that is decreased as the temperature of the switch controller 400 is increased such that the third thermal shutdown reference voltage V_REF_H is highest and the second thermal shutdown reference voltage V_REF_L is lowest. The temperature sensing voltage TSV according to an exemplary embodiment of the present invention is decreased as the temperature is increased. Accordingly, if the reference voltage V_REF is increased, the thermal shutdown protection operation time is advanced, and if the reference voltage is decreased, the thermal shutdown protection operation time is delayed.

The thermal shutdown unit 430 receives the feedback voltage VFB, the clock signal CLK, the power source detection signal VCCG, and the gate controlling signal VC to sense the state of the SMPS, and compares the corresponding thermal shutdown reference voltages among the first to third thermal shutdown reference voltages V_REF_C, V_REF_L, and V_REF_H with the temperature sensing voltage TSV. If the temperature sensing voltage TSV reaches the corresponding thermal shutdown reference voltage, the thermal shutdown unit 430 generates the thermal shutdown signal TSD of the high level. The thermal shutdown unit 430 may receive the feedback signal VF instead of the feedback voltage VFB.

Figure 3:
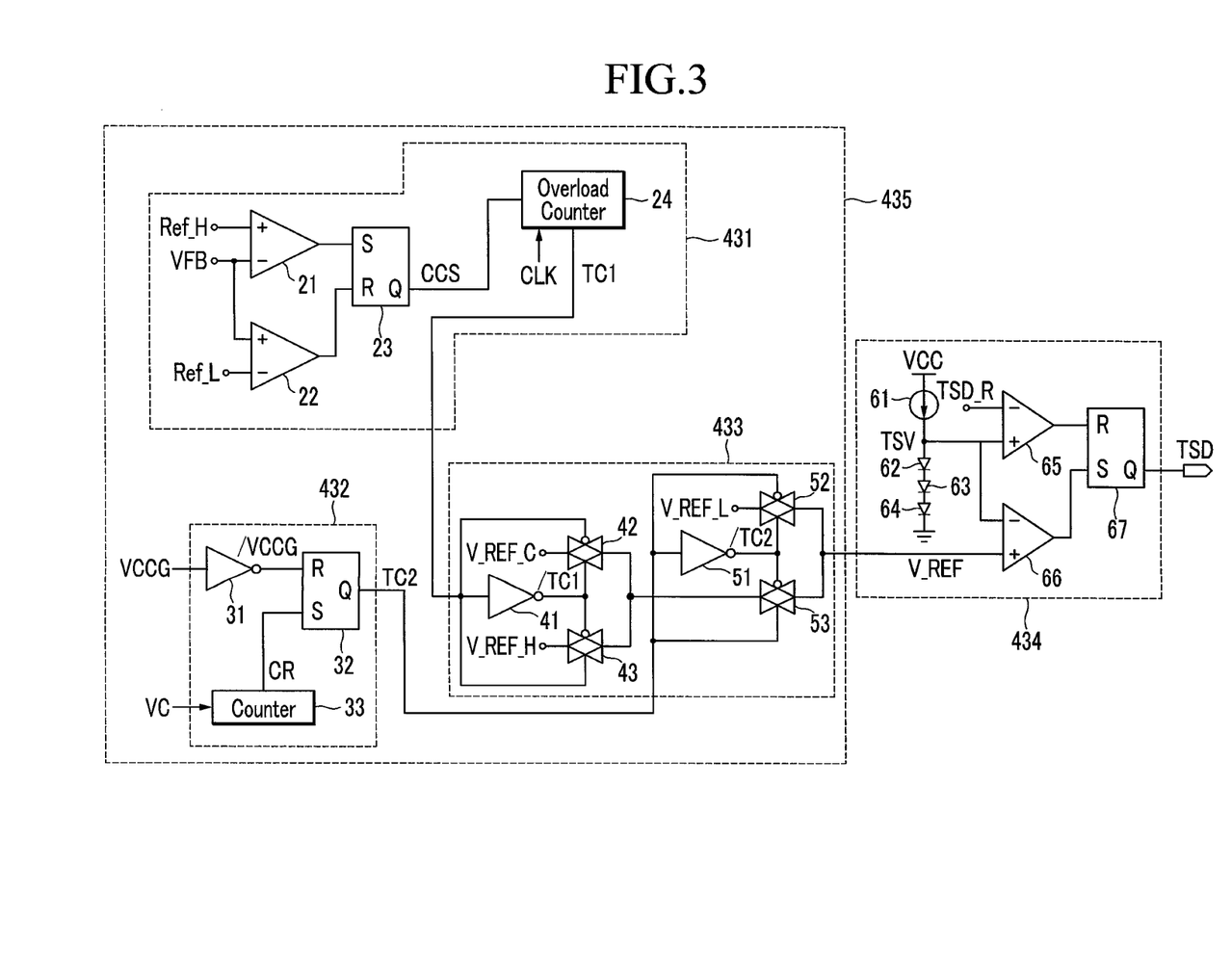
FIG. 3 is a view showing a configuration of a thermal shutdown unit 430 according to an exemplary embodiment of the present invention.

The configuration of the thermal shutdown unit 430 according to an exemplary embodiment of the present invention will be described with reference to FIG. 3. FIG. 3 is a view showing a configuration of a thermal shutdown unit 430 according to an exemplary embodiment of the present invention.

The thermal shutdown unit 430 includes a thermal shutdown reference voltage selection unit 435 and a thermal shutdown determiner 434. The thermal shutdown reference voltage selection unit 435 includes an overload sensing unit 431, a start-up sensing unit 432, and a reference voltage selector 433.

The thermal shutdown reference voltage selection unit 435 is the configuration for changing the thermal shutdown reference voltage V_REF according to the operation state of the SMPS.

The overload sensing unit 431 senses the overload by using the feedback voltage VFB. The overload sensing unit 431 determines the overload state if the feedback voltage VFB is increased to the overload reference voltage Ref_H for the determination of the overload, and if the overload state is maintained during a predetermined first delay period, it generates the first controlling signal TC1 to change the thermal shutdown reference voltage to the third thermal shutdown reference voltage V_REF_H.

The overload sensing unit 431 includes a first comparator 21, a second comparator 22, an overload latch 23, and an overload counter 24.

The non-inversion terminal (+) of the first comparator 21 is input with the overload reference voltage Ref_H, and the inversion terminal (−) is input with the feedback signal VFB. If the feedback signal VFB is larger than the overload reference voltage Ref_H, the first comparator 21 outputs the signal of the low level, and if the feedback signal VFB is smaller than the overload reference voltage Ref_H, the signal of the high level is output.

The non-inversion terminal (+) of the second comparator 22 is input with the feedback signal VFB, and the inversion terminal (−) is input with the normal reference voltage Ref_L. The normal reference voltage Ref_L may be set as the feedback voltage VFB when the operation state of the SMPS is the normal state. If the feedback signal VFB is higher than the normal reference voltage Ref_L, the second comparator 22 outputs the signal of the high level, and if the feedback signal VFB is lower than the normal reference voltage Ref_L, the signal of the low level is output.

The set terminal S of the overload latch 23 is connected to the output terminal of the first comparator 21, and the reset terminal R of the overload latch 23 is connected to the output terminal of the second comparator 22. The overload latch 23 generates the counter controlling signal CCS of the low level in synchronization with the decreasing edge of the signal input to the set terminal S. The overload latch 23 generates the counter controlling signal CCS of the high level in synchronization with the decreasing edge of the signal input to the reset terminal R.

If the load is increased such that the voltage of the feedback signal VFB is higher than the overload reference voltage Ref_H, the decreasing edge where the output signal of the first comparator 21 is decreased is generated. Thus, the overload latch 23 generates the counter controlling signal CCS of the low level.

If the load is decreased such that the voltage of the feedback signal VFB is lower than the normal reference voltage Ref_L, the decreasing edge where the output signal of the second comparator 22 is decreased is generated. Thus, the overload latch 23 generates the counter controlling signal CCS of the high level.

The operation of the overload counter 24 is started according to the counter controlling signal CCS, and if the clock signal CLK is counted by the first reference number corresponding to the first delay period, it generates the controlling signal TS1 of the high level. In detail, the operation of the overload counter 24 is started according to the counter controlling signal of the low level to count the overload counter 24. The operation of the overload counter 24 is stopped according to the counter controlling signal CCS of the high level. If the count result of the overload counter 24 becomes the first reference number. The counter 240 generates the first controlling signal TC1 of the high level. If the load is decreased in the first delay period such that the feedback voltage VFB is lower than the normal reference voltage Ref_L, the counter controlling signal CCS of the high level is generated. Thus, the operation of the overload counter 24 is stopped and the first controlling signal TC1 is maintained as the low level.

The start-up sensing unit 432 senses the start-up state of the SMPS by using the power source detection signal VCCG. Also, the start-up sensing unit 432 generates the second controlling signal TC2 informing of the finish of the start-up period after a predetermined second delay period is passed after the finish of the start-up state.

The start-up sensing unit 432 includes an inverter 31, a start-up latch 32, and a start-up counter 33. The inverter 31 inverts the power source detection signal VCCG. The start-up latch 32 includes a set terminal S input with the inverted inversion power source detection signal /VCCG and the reset terminal R input with the output signal of the start-up counter 33. The start-up latch 32 generates the second controlling signal TC2 of the low level in synchronization with the increasing edge of the signal input to the set terminal S, and generates the second controlling signal TC2 of the high level in synchronization with the increasing edge of the signal input to the reset terminal R.

The start-up counter 33 counts the increasing edge of the gate controlling signal VC to generate the reset signal CR of the high level if the count number reaches the second reference number corresponding to the second delay period.

If the start-up period is started, the power source detection signal VCCG is the low level such that the increasing edge where the inversion power source detection signal /VCCG is increased is generated. Thus, the start-up latch 32 generates the second controlling signal TC2 of the low level. After the start-up period is finished, if the power switch M starts the switching operation, the increasing edge of the gate controlling signal VC is generated. If the start-up counter 33 counts the increasing edge of the gate controlling signal VC by the second reference number, the reset signal CR of the high level is generated, and the start-up latch 32 generates the second controlling signal TC2 of the high level.

As described above, if the power source voltage VCC is decreased and the protection state period in which the switching operation is not generated is generated as well as the start-up period, the power source detection signal VCCG becomes the low level. Accordingly, the start-up counter 33 is operated with the same method as the start-up period during the protection state period.

The overload sensing unit 431 and the start-up sensing unit 432 respectively use the clock signal CLK and the gate controlling signal VC, however the present invention is not limited thereto. The gate signal VG is a signal having the same frequency among two signals such that gate controlling signal VC and the gate signal VG may be used instead of the overload sensing unit 431 and the clock signal CLK, and the start-up sensing unit 432 may use the clock signal CLK and the gate signal VG instead of the gate controlling signal VC. Also, the clock signal CLK, the gate controlling signal VC, and the gate signal VG having the constant frequency are used as the means to measure the first delay period and the second delay period such that the first delay period and the second delay period may be measured by counting the separated signal.

The reference voltage selector 433 selects one of the first to third thermal shutdown reference voltages V_REF_L, C, and H according to two controlling signals TC1 and TC2 and transmits it to thermal shutdown determiner 434.

The reference voltage selector 433 includes first and second inverters 41 and 51, and first to fourth transmission gates 42, 43, 52, 53.

The first inverter 41 inverts the first controlling signal TC1 to generate the first inversion controlling signal /TC1. The second inverter 51 inverts the second controlling signal TC2 to generate the second inversion controlling signal /TC2.

The first transmission gate 42 includes an input terminal input with the first thermal shutdown reference voltage V_REF_C, a first control terminal input with the first controlling signal TC1, a second control terminal input with the first inversion controlling signal /TC1, and an output terminal connected to the input terminal of the fourth transmission gate 53.

The second transmission gate 43 includes an input terminal input with the third thermal shutdown reference voltage V_REF_H, a first control terminal input with the first inversion controlling signal /TC1, a second control terminal input with the first controlling signal TC1, and an output terminal connected to the input terminal of the fourth transmission gate 53.

The third transmission gate 52 includes an input terminal input with the second thermal shutdown reference voltage V_REF_L, a first control terminal input with the second controlling signal TC2, a second control terminal input with the second inversion controlling signal /TC2, and an output terminal connected to the thermal shutdown determiner 434.

The fourth transmission gate 53 includes an input terminal connected to the output terminal of the first and second transmission gates 42 and 43, a first control terminal input with the second inversion controlling signal /TC2, a second control terminal input with the second controlling signal TC2, and an output terminal connected to the thermal shutdown determiner 434.

The first to fourth transmission gates 42, 43, 52, and 53 are turned on when the signal input to the first control terminal is the low level and the signal input to the second control terminal is the high level.

Accordingly, when the overload state is generated such the first controlling signal TC1 of the high level is generated, the second transmission gate 43 and the fourth transmission gate 53 are turned on such that the third thermal shutdown reference voltage V_REF_H is transmitted to the thermal shutdown determiner 434. Here, the second controlling signal TC2 is not the start-up period, but is the high level.

Also, when the start-up state is generated such that the second controlling signal TC2 of the low level is generated, only the third transmission gate 52 is turned on such that the second thermal shutdown reference voltage V_REF_L is transmitted to the thermal shutdown determiner 434. During the normal state period, the first controlling signal TC1 is the low level and the second controlling signal TC2 is the high level such that the first transmission gate 42 and the fourth transmission gate 53 are turned on and the first thermal shutdown reference voltage VCL is transmitted to the thermal shutdown determiner 434.

The thermal shutdown determiner 434 compares the thermal shutdown reference voltage transmitted from the reference voltage selector 433 with the temperature sensing voltage TSV to generate the thermal shutdown signal TSD according to the comparison result. In detail, the thermal shutdown determiner 434 generates the thermal shutdown signal TSD of the high level if the temperature sensing voltage TSV is decreased to the transmitted thermal shutdown reference voltage (one corresponding to the operation state of the SMPS of the first to third thermal shutdown reference voltages V_REF_L, V_REF_C, and V_REF_H).

The thermal shutdown determiner 434 includes a bias current source 61, three diodes 62, 63, and 64, a reset comparator 65, a shutdown comparator 66, and a thermal shutdown latch 67. The three diodes 62, 63, and 64 respectively include an anode and a cathode. The bias current source 61 is connected to the anode of the first diode 62, the cathode of the first diode 62 is connected to the anode of the second diode 63, the cathode of the second diode 63 is connected to the anode of the third diode 64, and the cathode of the third diode 64 is grounded. If the current of the bias current source 61 flows in the three diodes 62, 63, and 64, a voltage corresponding to the flowed current is generated to both terminals of the three diodes 62, 63, and 64. When the temperature of the diode is increased and the same current flows, there is a characteristic that the forward voltage between the anode and the cathode is decreased. Accordingly, as the heat generated in the switch controller 400 is increased such that the temperature near the three diodes 62, 63, and 64 is increased, the temperature sensing voltage TSV is decreased.

The voltage generated to the three diodes 62, 63, and 64 is the temperature sensing voltage TSV. The temperature sensing voltage TSV is input to the non-inversion terminal (+) of the reset comparator 65 and the inversion terminal (−) of the shutdown comparator 66. If the signal input to the non-inversion terminal (+) is higher than the signal input to the inversion terminal (−), the reset comparator 65 and the shutdown comparator 66 output the high level, an in the opposite case, the low level is output.

The inversion terminal (−) of the reset comparator 65 is input with the reset voltage TSD_R to stop the thermal shutdown protection operation, and the output terminal of the reset comparator 65 is connected to the reset terminal R of the thermal shutdown latch 67. If the temperature sensing voltage TSV is higher than the reset voltage TSD_R, the reset comparator 65 outputs the signal of the high level.

The non-inversion terminal (−) of the shutdown comparator 66 is input with the thermal shutdown reference voltage transmitted from the reference voltage selector 433, and the output terminal of the shutdown comparator 66 is connected to the set terminal S of the thermal shutdown latch 67. If the temperature sensing voltage TSV is decreased to the thermal shutdown reference voltage, the shutdown comparator 66 outputs the signal of the high level.

The thermal shutdown latch 67 generates the thermal shutdown signal TSD of the high level in synchronization with the increasing edge of the signal input to the set terminal S, and generates the thermal shutdown signal TSD of the low level in synchronization with the increasing edge of the signal input to the reset terminal R.

Accordingly, if the temperature sensing voltage TSV is decreased to the thermal shutdown reference voltage, the thermal shutdown latch 67 generates the thermal shutdown signal TSD of the high level in synchronization with the increasing edge of the output signal of the shutdown comparator 66. Also, if the temperature sensing voltage TSV is increased to the reset voltage TSD_R, the thermal shutdown latch 67 generates the thermal shutdown signal TSD of the low level in synchronization with the increasing edge of the output signal of the reset comparator 65.

Next, the operation of the thermal shutdown unit 430 according to an exemplary embodiment of the present invention will be described with reference to FIG. 4 to FIG. 6.

FIG. 4 is a view showing a time that a thermal shutdown protection operation is generated according to the operation state of the SMPS when a temperature sensing voltage TSV is decreased according to a temperature increase of a switch controller 400 according to an exemplary embodiment of the present invention.

As shown in FIG. 4, in the normal state, the temperature sensing voltage TSV reaches the first thermal shutdown reference voltage V_REF_C at the temperature T22 such that the thermal shutdown signal TSD is increased at the temperature T22.

During the start-up period, the temperature sensing voltage TSV reaches the second thermal shutdown reference voltage V_REF_L at the temperature T23 such that the thermal shutdown signal TSD is increased at the temperature T23. That is, the thermal shutdown protection operation is started at the temperature T23 that is higher than the temperature T22 at which the thermal shutdown signal TSD is generated in the normal state. Accordingly, the start time of the thermal shutdown protection operation may be delayed.

During the overload period, the temperature sensing voltage TSV reaches the third thermal shutdown reference voltage V_REF_H at the temperature T21 such that the thermal shutdown signal TSD is increased at the temperature T21. That is, the thermal shutdown protection operation is started at the temperature T21 that is lower than the temperature T22 at which the thermal shutdown signal TSD is generated in the normal state. Accordingly, the start of the thermal shutdown protection operation may be advanced. In this way, although the heat generated in the switch controller 400 is the same, the thermal shutdown protection operation is generated at different times according to the operation state of the SMPS. Accordingly, the error of the thermal shutdown protection operation due to the temperature difference between the switch controller 400 and the power switch M may be prevented.

Figure 5:
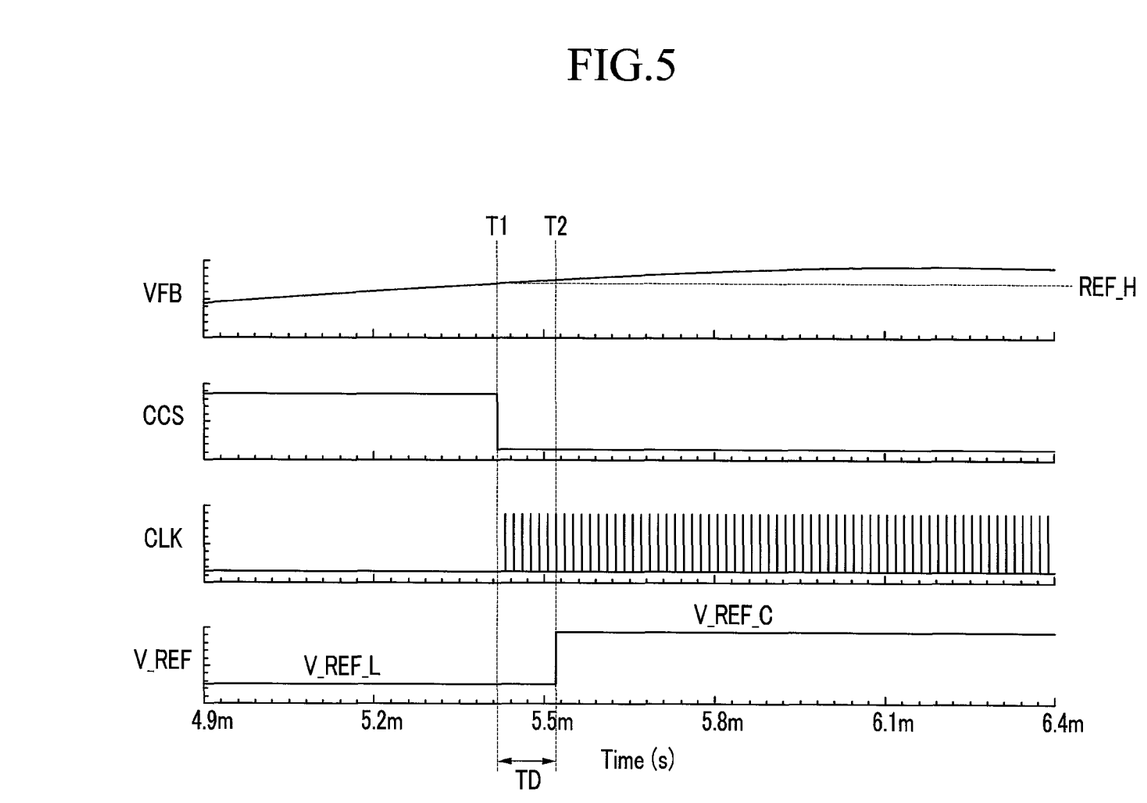
FIG. 5 is a waveform diagram showing a feedback voltage VFB, a counter controlling signal CCS, a clock signal CLK, and a reference voltage V_REF when an SMPS according to an exemplary embodiment of the present invention is operated in an overload state.

FIG. 5 is a waveform diagram showing a feedback voltage VFB, a counter controlling signal CCS, a clock signal CLK, and a reference voltage V_REF when an SMPS according to an exemplary embodiment of the present invention is operated in an overload state.

As shown in FIG. 5, if the feedback voltage VFB reaches the overload reference voltage Ref_H at the time T1, the counter controlling signal CCS becomes the low level. Thus, the thermal shutdown reference voltage V_REF is changed from the first thermal shutdown reference voltage V_REF_C to the third thermal shutdown reference voltage V_REF_H at the time T2 at which the clock signal CLKRK is counted by the first reference number (seven times in FIG. 5) corresponding to the first delay period TD.

Figure 6:
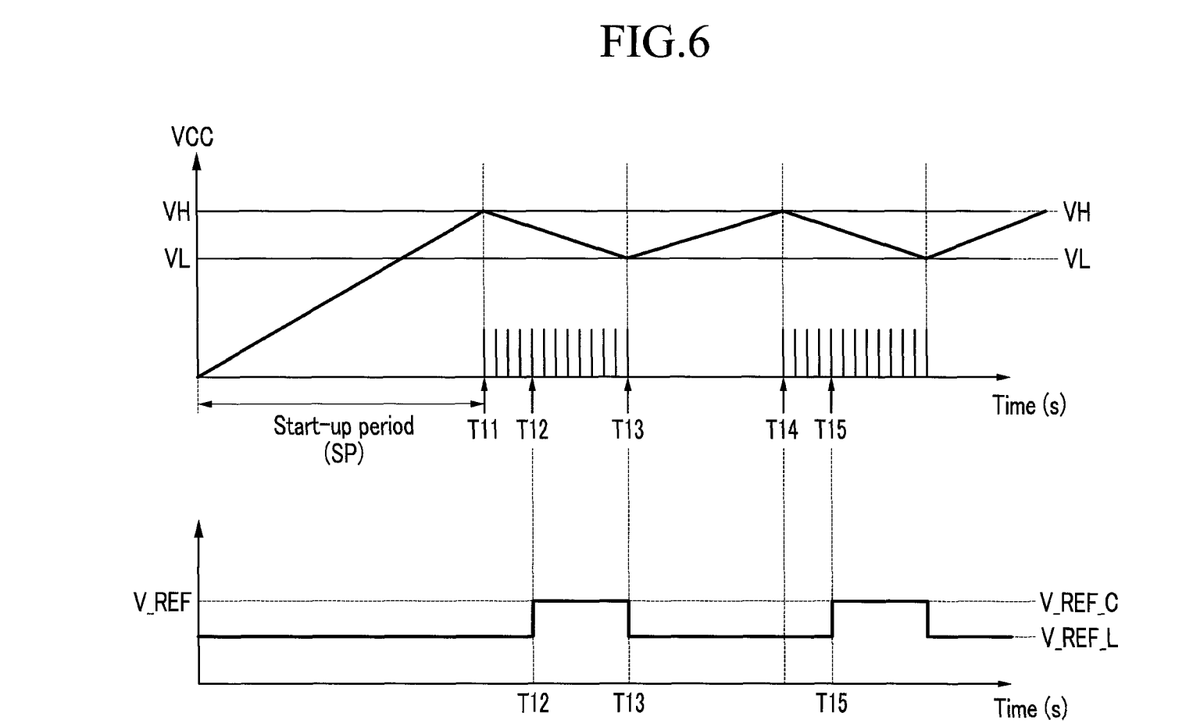
FIG. 6 is a waveform diagram showing a power source voltage VCC and reference voltage V_REF during a start-up period SP of an SMPS according to an exemplary embodiment of the present invention.

FIG. 6 is a waveform diagram showing a power source voltage VCC and a thermal shutdown reference voltage V_REF during a period including a start-up period SP of an SMPS according to an exemplary embodiment of the present invention. It is assumed that the power source voltage VCC has a waveform as shown in FIG. 6.

During the start-up period SP, the thermal shutdown reference voltage V_REF is maintained as the second thermal shutdown reference voltage V_REF_L. The thermal shutdown reference voltage V_REF is changed from the second thermal shutdown reference voltage V_REF_L to the first thermal shutdown reference voltage V_REF_C from the time T11 at which the power source voltage VCC reaches the second low voltage reference voltage VH to the time T12 at which the gate controlling signal VC is counted by the second reference number (five times in FIG. 6) corresponding to the second delay periods T11-T12.

As shown in FIG. 6, if the power source voltage is decreased to the first low voltage reference voltage VL after the start-up period is finished, the protection state period at which the switching operation is stopped is generated.

If the power source voltage VCC is decreased to the first low voltage reference voltage VL at the time T13, the thermal shutdown reference voltage V_REF is changed from the first thermal shutdown reference voltage V_REF_C to the second thermal shutdown reference voltage V_REF_L.

During the period T13-T14 at which the switching operation is not generated, the power source voltage VCC is increased and reaches the second low voltage reference voltage VH at the time T14. The switching operation is started from the time T14, and the thermal shutdown reference voltage V_REF is changed from the second thermal shutdown reference voltage V_REF_L to the first thermal shutdown reference voltage V_REF_C at the time T15 at which the gate controlling signal VC is counted by the second reference number (five times in FIG. 6) corresponding to the second delay period T14-T15.

That is, the thermal shutdown reference voltage V_REF is decreased to the second thermal shutdown reference voltage V_REF_L during the protection state period in which the power source voltage VCC is decreased such that the switching operation is not decreased, as well as the start-up period. In an exemplary embodiment of the present invention, the reference voltage V_REF of the protection state as one of the operation states of the SMPS is the same voltage as the second thermal shutdown reference voltage, however the present invention is not limited thereto.

As described above, the reference temperature for the protection state may be set as a different temperature from the second reference temperature and higher than the first reference temperature. Accordingly, the voltage that is lower than the first thermal shutdown reference voltage V_REF_C as the voltage that is different from the second thermal shutdown reference voltage V_REF_L may set as the thermal shutdown reference voltage of the protection state.

As described above, the thermal shutdown unit according to an exemplary embodiment of the present invention uses different thermal shutdown reference voltages according to the operation state of the SMPS such that the thermal shutdown protection operation may be correctly controlled without the additional sensing circuit.

The drawings and the detailed description described above are examples for the present invention and are provided to explain the present invention, and the scope of the present invention described in the claims is not limited thereto. Therefore, it will be appreciated to those skilled in the art that various modifications may be made and other equivalent embodiments are available. Accordingly, the actual scope of the present invention must be determined by the spirit of the appended claims.

DESCRIPTION OF SYMBOLS bridge diode 100, transformer 200, feedback circuit unit 300
controller 500, power switch M, primary side coil Co1,
secondary side coil Co2, switch controller 400, diode 11-14
shunt regulator 301, opto diode 302, opto transistor 303
feedback capacitor 304, PWM controller 410, soft start circuit 420
thermal shutdown unit 430, feedback unit 440, gate driver 460
low voltage shutdown unit 470, power source current source 480
power source controlling switch 490, feedback current source 441
diode D11 and D12, resistor R1 and R2, PWM comparator 411
SR latch 412, oscillator 413, logic operator 414
thermal shutdown signal TSD, sensing voltage VSENSE
soft start voltage SS, feedback signal VFB
thermal shutdown reference voltage selection unit 435
thermal shutdown determiner 434, overload sensing unit 431
start-up sensing unit 432, reference voltage selector 433

What is claimed is:

1. A method of controlling a thermal shutdown protection operation of a controller controlling an operation of an SMPS, comprising:
   determining whether the SMPS is in an overload state;
   determining whether the SMPS is in a start-up state in which the SMPS starts to be operated; and
   varying a reference temperature to control the thermal shutdown protection operation of the controller according to a result of the determination of whether the SMPS is in the overload state and a result of the determination of whether the SMPS is in the start-up state,
   wherein the variation of the reference temperature includes setting up the reference temperature corresponding to the overload state as a temperature that is lower than the reference temperature corresponding to the start-up state.

2. The method of claim 1, further comprising determining whether the SMPS is in a protection state in which a power source voltage for the operation of the controller is decreased such that a switching operation of the power switch controlling the operation of the SMPS is not generated,
   wherein the variation of the reference temperature is according to the result of the determination of whether the SMPS is in the overload state, the result of the determination of whether the SMPS is in the start-up state, and a result of the determination of whether the SMPS is in the protection state.

3. The method of claim 2, wherein, in the variation of the reference temperature, the reference temperature corresponding to the overload state is set up as the temperature that is lower than the reference temperature corresponding to the start-up state and the reference temperature corresponding to the protection state.

4. The method of claim 2, wherein the variation of the reference temperature includes:
   setting up the reference temperature as a first reference temperature when an operation state of the SMPS is a normal state;
   setting up the reference temperature as a second reference temperature when the operation state of the SMPS is the start-up state;
   setting up the reference temperature as a third temperature when the operation state of the SMPS is the overload state; and
   setting up the reference temperature as a fourth temperature when the operation state of the SMPS is the protection state,
   wherein the first reference temperature is lower than the second and fourth reference temperatures and higher than the third reference temperature.

5. The method of claim 1, wherein the determination of whether the SMPS is in the overload state includes determining an overload by using a feedback voltage corresponding to an output voltage of the SMPS.

6. The method of claim 1, wherein the determination of whether the SMPS is in the start-up state includes sensing a power source voltage for the operation of the controller.

7. The method of claim 1, wherein the variation of the reference temperature includes:
   setting up the reference temperature as a first reference temperature when an operation state of the SMPS is normal state;
   setting up the reference temperature as a second reference temperature when the operation state of the SMPS is the start-up state; and
   setting up the reference temperature as a third temperature when the operation state of the SMPS is the overload state as,
   wherein the first reference temperature is lower than the second reference temperature and higher than the third reference temperature.

8. A thermal shutdown unit controlling a thermal shutdown protection operation of a controller controlling an operation of an SMPS, comprising;
   at least one diode;
   a shutdown comparator comparing a temperature sensing voltage generated in the at least one diode with a thermal shutdown reference voltage to control the thermal shutdown protection operation; and
   a thermal shutdown reference voltage selection circuit outputting the thermal shutdown reference voltage and varying the thermal shutdown reference voltage according to an operation state of the SMPS,
   wherein the temperature sensing voltage is varied according to heat generated in the controller, the operation state of the SMPS includes an overload state and a start-up state, the thermal shutdown reference voltage selection circuit sets the thermal shutdown reference voltage to a third thermal shutdown reference voltage when the SMPS is in the overload state and to a second thermal shutdown reference voltage when the SMPS is in the start-up state, and the third thermal shutdown reference voltage indicates a temperature that is lower than a temperature indicated by the second thermal shutdown reference voltage.

9. The thermal shutdown unit of claim 8, wherein the operation state of the SMPS further includes a protection state in which a power source voltage for the operation of the controller is decreased such that a switching operation of the power switch controlling the operation of the SMPS is not generated.

10. The thermal shutdown unit of claim 9, wherein the thermal shutdown reference voltage corresponding to a normal state is different from the thermal shutdown reference voltage corresponding to the start-up state, the protection state, or the overload state.

11. The thermal shutdown unit of claim 8, wherein the thermal shutdown reference voltage corresponding to the normal state is different from the thermal shutdown reference voltage corresponding to the start-up state and the thermal shutdown reference voltage corresponding to the overload state.

12. The thermal shutdown unit of claim 11, wherein the thermal shutdown reference voltage corresponding to the overload state is different from the thermal shutdown reference voltage corresponding to the start-up state.

13. The thermal shutdown unit of claim 12, wherein the temperature sensing voltage is decreased as a temperature of the controller is increased.

14. The thermal shutdown unit of claim 8, wherein the thermal shutdown reference voltage selection circuit comprises:
an overload sensing unit sensing the overload state by using a feedback voltage corresponding to an output voltage of the SMPS;
a start-up sensing unit sensing the start-up state by using a power source voltage for the operation of the controller; and
a reference voltage selector selecting a first thermal shutdown reference voltage when the SMPS is in a normal state, the second thermal shutdown reference voltage when the SMPS is in the start-up state, or the third thermal shutdown reference voltage when the SMPS is in the overload state.

15. The thermal shutdown unit of claim 14, wherein the overload sensing unit includes:
a first comparator generating an output signal according to a result of comparing the feedback voltage with a predetermined overload reference voltage to determine whether the SMPS is in the overload state;
a counter generating a first controlling signal if a predetermined first delay period is counted from a time that the overload state is generated; and
an overload latch operating the counter in synchronization with the output signal of the first comparator,
the feedback voltage is higher than the overload reference voltage if the overload state is generated.

16. The thermal shutdown unit of claim 15, wherein the start-up sensing unit comprises a second counter generating a second controlling signal if the predetermined second delay period is counted from a time that the power source voltage is increased to a voltage level for the operation of the controller.

17. The thermal shutdown unit of claim 16, wherein the reference voltage selector selects the third thermal shutdown reference voltage according to the first controlling signal and the second thermal shutdown reference voltage according to the second controlling signal.

18. The thermal shutdown unit of claim 17, wherein the reference voltage selector comprises:
a first transmission gate having an input terminal input with the first thermal shutdown reference voltage, a first control terminal input with the first controlling signal, a second control terminal input with a first inversion controlling signal of which the first controlling signal is inverted, and an output terminal;
a second transmission gate having an input terminal input with the third thermal shutdown reference voltage, a first control terminal input with the first inversion controlling signal, a second control terminal input with the first controlling signal, and an output terminal; and
a third transmission gate having an input terminal connected to the output terminal of the first and second transmission gates, the first control terminal input with the second inversion controlling signal of which the second controlling signal is inverted, the second control terminal input with the second controlling signal, and an output terminal connected to the input terminal of the shutdown comparator.

19. The thermal shutdown unit of claim 18, wherein the reference voltage selector further comprises:
a fourth transmission gate having an input terminal input with the second thermal shutdown reference voltage, the first control terminal input with the second controlling signal, a second control terminal input with the second inversion controlling signal, and an output terminal connected to one input terminal of the shutdown comparator.

20. The thermal shutdown unit of claim 19, wherein the shutdown comparator comprises:
one input terminal connected to the output terminal of the third and fourth transmission gates; and
the other input terminal input with the temperature sensing voltage.

21. A switch controller controlling a switching operation of a power switch controlling an operation of an SMPS, comprising:
a PWM controller controlling turn-off of a power switch according to a feedback voltage corresponding to an output voltage and a sensing voltage corresponding to a current flowing through the power switch, and turning on the power switch according to a clock signal determining a switching frequency of the power switch; and
a thermal shutdown unit varying a thermal shutdown reference voltage controlling a thermal shutdown protection operation of the switch controller according to an operation state of the SMPS, and generating a thermal shutdown signal and transmitting it the thermal shutdown signal to the PWM controller if a temperature sensing voltage corresponding to a temperature of the switch controller reaches the thermal shutdown reference voltage,
wherein the PWM controller turns off the power switch according to the thermal shutdown signal, and the thermal shutdown unit sets the thermal shutdown reference voltage to a third thermal shutdown reference voltage when the SMPS is in an overload state and to a second thermal shutdown reference voltage when the SMPS is in a start-up state, and the third thermal shutdown reference voltage indicates a temperature that is lower than a temperature indicated by the second thermal shutdown reference voltage.

22. The switch controller of claim 21, wherein the thermal shutdown unit comprises:
   at least one diode of which the temperature sensing voltage is generated;
   a shutdown comparator comparing the temperature sensing voltage with the thermal shutdown reference voltage to control the thermal shutdown protection operation; and
   a thermal shutdown reference voltage selection circuit outputting the thermal shutdown reference voltage and changing the thermal shutdown reference voltage according to the operation state of the SMPS,
   wherein the temperature sensing voltage is varied according to heat generated in the controller, and the operation state of the SMPS includes an overload state and a start-up state.

23. The switch controller of claim 22, wherein the operation state of the SMPS further includes a protection state in which a power source voltage for the operation of the controller is decreased such that the switching operation of the power switch controlling the operation of the SMPS is not generated.

24. The switch controller of claim 23, wherein a thermal shutdown reference voltage corresponding to a normal state is different from the thermal shutdown reference voltage corresponding to the start-up state, the protection state, or the overload state.

25. The switch controller of claim 24, wherein the temperature sensing voltage is decreased as the temperature of the switch controller is increased.

26. The switch controller of claim 25, wherein the thermal shutdown reference voltage corresponding to the normal state is higher than the thermal shutdown reference voltage corresponding to the start-up state and lower than the thermal shutdown reference voltage corresponding to the overload state.

27. The switch controller of claim 25, wherein the thermal shutdown reference voltage corresponding to the protection state is lower than the thermal shutdown reference voltage corresponding to the normal state and the thermal shutdown reference voltage corresponding to the overload state.

* * * * *